United States Patent
Nakamura et al.

(10) Patent No.: US 7,809,503 B2
(45) Date of Patent: Oct. 5, 2010

(54) NAVIGATION APPARATUS

(75) Inventors: Masaki Nakamura, Okazaki (JP); Takayuki Miyajima, Anjyo (JP); Motohiro Nakamura, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/794,301

(22) PCT Filed: Dec. 27, 2005

(86) PCT No.: PCT/JP2005/023858

§ 371 (c)(1), (2), (4) Date: Jan. 24, 2008

(87) PCT Pub. No.: WO2006/070785

PCT Pub. Date: Jul. 6, 2006

(65) Prior Publication Data

US 2009/0024320 A1    Jan. 22, 2009

(30) Foreign Application Priority Data

Dec. 27, 2004    (JP)    ............................. 2004-377089

(51) Int. Cl.
G01C 21/30    (2006.01)
(52) U.S. Cl. ..................... 701/210; 701/207; 340/995.2
(58) Field of Classification Search ................. 701/210, 701/207, 209; 340/995.17, 995.2, 995.21
See application file for complete search history.

(56) References Cited

U.S. PATENT DOCUMENTS

2005/0021227 A1 *  1/2005  Matsumoto et al. ......... 701/207

FOREIGN PATENT DOCUMENTS

JP    A-07-063566    3/1995

(Continued)

OTHER PUBLICATIONS

Japanese Patent Office, Partial Translation of Notification of Reason for Rejection mailed May 13, 2010 in Japanese Patent Application No. 2008-101978 w/English-language Translation.

*Primary Examiner*—Mark Hellner
*Assistant Examiner*—Helal A Algahaim
(74) *Attorney, Agent, or Firm*—Oliff & Berridge, PLC

(57) ABSTRACT

A navigation apparatus is obtained that can reduce as much as possible to blank interval during the navigation even when a route deviation has occurred. In order to structure a navigation apparatus that includes a guided vehicle position determining portion 3c that finds the position of a guided vehicle and a recommended route searching portion 3i that searches for a recommended route to a destination point, a problem condition identifying portion 3f is provided that identifies the presence or absence of a problem condition that makes the travel along the recommended route Ro difficult when viewed in terms of the current condition of the guided vehicle with respect to the recommended route Ro forward travel side of the position of the guided vehicle, and a route deviation plan portion 3h is provided that sets a point that the guided vehicle is anticipated to reach under the presence of the problem condition to the starting point, activates the recommended route searching portion 3i, and searches for a new recommended route Rn from the starting point to a destination point in the case in which the problem condition identifying portion 3f has identified that a problem condition is present.

16 Claims, 9 Drawing Sheets

FOREIGN PATENT DOCUMENTS

| | | |
|---|---|---|
| JP | A 7-063566 | 10/1995 |
| JP | A 8-030193 | 2/1996 |
| JP | A 8-110236 | 4/1996 |
| JP | A 11-023305 | 1/1999 |
| JP | A 2003-344077 | 3/2003 |
| JP | A 2004-61356 | 2/2004 |
| JP | A 2004-245676 | 9/2004 |

* cited by examiner

La

| LINK NUMBER | NODE NUMBER | ROAD CATEGORY | LINK LENGTH | WIDTH |
|---|---|---|---|---|
| 1 | 21-27 | NATIONAL HIGHWAY | 100 | 8 |
| 2 | 101-38 | TOLL ROAD | 3000 | 12 |
| 3 | | | | |
| ⋮ | | | | |
| nnn | | | | |

| MONTH/DAY | TIME | LINK NUMBER | CONGESTION DEGREE | TRAVEL TIME |
|---|---|---|---|---|
| JANUARY 1 | 00:00 | 1 | 1 | 20 |
| | | 2 | 4 | 135 |
| | | ⋮ | ⋮ | ⋮ |
| | | nnn | 2 | 42 |
| | 00:15 | | | |
| | ⋮ | | | |
| | 23:45 | | | |
| JANUARY 2 | 00:00 | | | |
| | ⋮ | | | |
| | 23:45 | | | |
| ⋮ | ⋮ | | | |
| DECEMBER 31 | 00:00 | | | |
| | | | | |
| | 23:45 | | | |

FIG. 5

NAVIGATION APPARATUS

TECHNICAL FIELD

The present invention relates to navigation apparatuses that are provided with guided vehicle position determining portion that find the position of a guided vehicle and recommended route searching portion that search for a recommended route to a destination point.

BACKGROUND ART

This type of a navigation apparatus is mounted to the side of a driver's seat, and carries out driving assistance by displaying a recommended route from a starting point to a destination point on, for example, on a liquid crystal display, and providing an appropriate route (recommended route) to the destination point to the driver.

Presently, this type of search for a recommended route is carried out by combining information about traffic congestion, traffic regulations, construction, traffic accidents and the like, that has been collected at a traffic information center, and the information about the time that is necessary to pass through a "link" that is set at a distance of hundreds of meters to several kilometers on major arterial roads.

Executing what is determining route deviation identification has been proposed for the navigation state in which this type of recommended route is found.

A navigation apparatus that has this configuration is provided with a route deviation identifying portion that identifies whether or not the position of the guided vehicle has deviated from the recommended route. In the case in which the route deviation identifying portion has identified that the position of the guided vehicle has deviated from the recommended route, from the point in time that this identification is made (the position of the guided vehicle at the time of this identification), the recommended route searching portion is activated to search for a new recommended route to the destination point.

Therefore, when the guided vehicle has deviated from a route, the user is provided with a recommended route that is found by the navigation apparatus by carrying out a new search, and the user can arrive at the destination point after deviating from a route.

Problems that occur with this type of route deviation plan in this situation will be explained with reference to FIG. 12A and FIG. 12B.

FIG. 12 shows a situation in which this type of route deviation has occurred, and the vehicle is traveling on a one-way road that has a plurality of lanes. In FIG. 12, the roads are all one-way roads, and the horizontal cruising road that runs in the left to right direction in the figure depicts a left horizontal cruising road ra that has four lanes, and vertical cruising roads that run from top to bottom in the figure depict three-lane vertical cruising roads. Furthermore, the left vertical cruising road rbl that is on the left side of the figure and the right vertical cruising road rbr that is on the right side are examples of roads that run in the vertical direction.

For a road network that has the structure described above, the recommended route Ro, which has been searched for and provided by the recommended route searching portion, is set from a starting point S side in the lower left of the figure to a destination point D side that is ahead on the right vertical cruising road rbr.

In such a traffic network, the guided vehicle successively receives navigation instructions from the navigation apparatus. In a road network having such a configuration, when attempting to enter from the lower left point of the left vertical cruising road rbl in the figure, it is necessary to use the upper cruising lane as far as possible, in order to enter the right vertical cruising road rbr at the horizontal cruising road portion (this position is referred to as the intermediate road position rm), which is between the left vertical cruising road rbl and the right vertical cruising road rbr.

However, as shown in FIG. 2B, at this intermediate road position, there are cases in which, due to some sort of condition, it is possible to enter only at the cruising lane on the lowest side. This type of problem may be, for example, a case in which the intermediate road position rm is congested and the guided vehicle cannot select an appropriate lane, or a case in which the user is not aware that there is a lane selection to be made and has simply entered the lowest lane.

Even in this situation, because at this moment the vehicle has entered the intermediate road position rm, the navigation apparatus does not identify that the guided vehicle has deviated from the route at the intermediate road position rm.

In the intermediate road position rm, in the case in which a mistaken lane selection has been made and the vehicle can only travel straight along the horizontal travel road ra, the vehicle proceeds forward and then actually deviates from the route.

This situation is recognized by the navigation apparatus, and at this stage (the state in which the point C in FIG. 12A has been passed), the route deviation plan portion first operates, the present position B is set to the starting point, as shown in FIG. 12B, and the route search to the destination point is carried out. As a result, a blank interval shown by the time lag between the points C and B occurs in the navigation according to a newly found recommended route, which is not preferable.

As an example of a technology for suppressing the occurrence of such blank intervals, a technology has been proposed in which a deviation from the recommended route is anticipated, and recommended routes to be used after this deviation are found in advance (Patent Document 1).

Furthermore, technology exists in which a backup route is found in advance only for recommended intersection points with the object of reducing the amount of calculation in Patent Document 1 (Patent Document 2).

Patent Document 1: Japanese Patent Application Publication No. JP-A-HEI8-30193 (claims)

Patent Document 2: Japanese Patent Application Publication No. JP-A-2003-344077 (claims)

DISCLOSURE OF THE INVENTION

Problems to be Solved by the Invention

As described above, in a technology in which a deviation from a recommended route is anticipated and backup routes are prepared in advance, because the possibility of a deviation is not efficiently and specifically determined, it is necessary to prepare a comparatively large number of backup recommended routes, and there are problems in that the amount of calculation is large and the amount of data resulting from the calculations that has to be stored becomes large.

In consideration of the circumstances described above, it is an object of the present invention to provide a navigation apparatus that enables reducing the blank interval during the navigation to as short a time as possible when a course deviation has occurred, and enables carrying out this preparation efficiently even in a configuration in which backup recommended routes are found in advance, and to provide a navigation method that can realize this type of navigation.

Means for Solving the Problem

In order to attain the object described above, a characteristic configuration of a navigation apparatus that is provided with a guided vehicle position determining portion that finds the position of the guided vehicle and a recommended route searching portion that searches for recommended routes to a destination point, is provided with a problem condition identifying portion that identifies the presence or absence of a problem condition that makes travel along a recommended route difficult in terms of the current state of the guided vehicle with respect to the recommended route forward travel side of the position of the guided vehicle, and provided with a route deviation backup plan portion that, in the case in which the problem condition identifying portion has identified that a problem condition is present, sets a position that the vehicle is anticipated to reach after departing from the recommended route under the problem condition to the starting point, activates the recommended route searching portion, and searches for a new recommended route from this starting point to the destination point.

This navigation apparatus is provided with the problem condition identifying portion, and this portion identifies the presence or absence of a problem condition that would make travel along the recommended route difficult in terms of the current condition of the guided vehicle with respect to the recommended route forward travel side of the position of the guided vehicle. In addition, in the case in which it has been identified that a problem condition is present, the route deviation backup plan portion is activated, the point at which the vehicle is anticipated to arrive after deviating from the recommended route in the current condition of the guided vehicle is set to the starting point, and the recommended route searching portion is activated to search for a new recommended route from this starting point to the destination point.

The search procedure for this case is similar to a conventional route deviation plan portion. However, this starting point is set to a position that can be reached under the problem condition after deviating from the recommended route in the current state of the guided vehicle.

In addition, in this configuration, the identification is carried out by the problem condition identifying portion, and as a result of this identification, in the case in which there is a possibility that the guided vehicle will deviate from the recommended route, the search for a new recommended route based on this deviated travel route is executed at the point in time that the identification has been carried out by the problem condition identifying portion.

As a result, by carrying out a new route search at the stage in which there is a possibility that the guided vehicle will deviate from the route, it is possible to reduce the blank interval in the navigation that has been explained above in comparison to the conventional case in which a new route search is executed when a route deviation has occurred.

Furthermore, a backup recommended route that will be used in the case in which the guided vehicle ends up deviating from the recommended route is not found for each course change point. Rather, taking into consideration the current travel condition, a configuration is possible in which only the necessary minimum number of new recommended route searches is carried out depending on the efficient and specific conditions because a new recommended route is searched for when the presence of a problem condition has actually been identified.

In the case of this configuration, a navigation method in a navigation apparatus, which is provided with a guided vehicle position determining portion that finds the position of the guided vehicle and a recommended route searching portion that searches for a recommended route to a destination point, is provided with the following characteristic portion.

Specifically, in this navigation method, the presence or absence of a problem condition that makes travel along a recommended route difficult in terms of the current condition of the guided vehicle with respect to the recommended route forward travel side of the position of the guided vehicle. In the case in which the presence of a problem condition has been identified, a point that the guided vehicle is anticipated to reach after deviating from the recommended route under the problem condition is set to the starting point, a route deviation plan is executed in which new recommended routes from this starting point to the destination point are found, and navigation is carried out according to this newly found recommended route.

In a navigation apparatus having the configuration described above, preferably the guided vehicle position determining portion is provided with a guided vehicle lane position determining portion that finds the position of the lane on which the guided vehicle is traveling, and the problem condition identifying portion identifies that a problem condition is present based on the guided vehicle lane position that has been determined by the guided vehicle lane position determining portion.

In current navigation apparatuses, it is becoming possible to detect the position of the guided vehicle at a cruising lane unit on the cruising road. For example, the approximate position of the guided vehicle may be determined by an apparatus such as a GPS, and the positions of the lane markers, road shoulders and the like that are on the road are determined by a mounted camera that is provided on the guided vehicle, the characteristics such as the number of lanes, the number of white lines, the shoulders and the like at this location are indexed from map information about the position of the guided vehicle that has been found in advance, and based on the information related to the photographic information that has been obtained from the mounted camera and the number of cruising lanes that has been obtained from the map information, it is possible to determine the cruising lane in which the guided vehicle is currently traveling.

As explained above in the section about the problems to be solved in the present application, the cruising lane in which the guided vehicle is currently traveling is an important element with respect to the selection of the travel route.

For example, as a recommended route, irrespective of whether there is a point that is necessary for a right turn or a left turn on the forward travel side, in a case in which, for example, the guided vehicle is not traveling along a cruising lane from which a left turn or a right turn is possible, it must be determined that future travel along a recommended route will be difficult.

Thus, providing a guided vehicle lane position determining portion and problem condition identifying portion that identifies whether travel along the recommended route is possible based on the results of the determination of the guided vehicle lane position determining portion is efficient, and the new recommended route search according to the present application can be carried effectively, provisionally, and efficiently.

In the case of this apparatus, the position of the lane in which the guided vehicle is traveling is found, and in order to carry out the problem condition identification, a navigation method in the navigation apparatus is executed that identifies that a problem condition is present based on the lane position of the guided vehicle.

In the identification by the problem condition identifying portion, preferably the identification is carried out based on at least one of the traffic category restriction information and the traffic regulation information at the point on the road at which the guided vehicle is traveling, the distance information to an initial course change point on the recommended route forward travel side of the position of the guided vehicle, the peripheral carrier information, that is information related to carriers that are traveling in the vicinity of the guided vehicle, and guided vehicle travel information related to the travel condition of the guided vehicle.

At the travel point at which the guided vehicle is traveling, left turns or right turns that are included in the travel along the recommended route may not be possible due to a traffic category restriction or traffic regulations that depend on the cruising lane of the guided vehicle. Furthermore, irrespective of whether the distance to an approaching point on the course recommended is short, in the case in which the guided vehicle is not traveling along a cruising lane, a left turn or right turn that is included in the travel along the recommended route may similarly not be possible. Furthermore, in the case in which many vehicles are present in the vicinity of the guided vehicle, a lane change itself may be difficult to perform. In addition, similarly, in the case in which the travel speed of the guided vehicle is high, a left turn or a right turn that is a course guided point and is included in travel along the recommended route, may not be possible.

Thus, the problem condition identifying portion carries out identification taking into consideration any of these necessary elements. In this manner, it is possible to carry out the navigation that accurately corresponds to the current condition of the guided vehicle.

Preferably, the navigation apparatus that has been explained above is provided with a problem condition identified position determining portion that determines the problem identified zones or positions that will be subject to problem condition identification by the problem condition identifying portion.

In the present application, in order to identify whether or not it is possible for the guided vehicle to travel along a recommended route, both positions on the recommended route that require this identification and positions that do not necessarily require this identification are present. For example, during travel in which an intersection is approaching that is a course change point, which is an object of identification, in the case in which the recommended route at that intersection is a left turn or a right turn, the problem condition identification is naturally necessary at a position that is separated from this intersection by a predetermined distance. In contrast, during travel that follows a road, problem condition identification is not always necessary. Therefore, it is possible to accurately set problem condition identified positions, which are determined with respect to the recommended route, by providing a problem condition identified position determining portion and, for example, setting a zones or positions that are a predetermined distance from a particular intersection as a problem condition identified positions. It is possible to reduce thereby unnecessary identification processing.

Preferably, the problem condition identified position determining portion is a structure that determines the problem condition identified positions that will be subject to problem condition identification based on the relation to an initial course change point on the recommended route forward travel side of the position of the guided vehicle, and the distance from the initial course change point on the recommended route to the problem condition identified position is variable.

In this manner, the distance from the initial course change point on the recommended route to the problem condition identified position can be variably determined based on at least one of the lane information, traffic category restriction information and traffic regulation information, at the road position at which the guided vehicle is traveling, peripheral carrier information, which is information related to carriers that are traveling in the vicinity of the guided vehicle, or guided vehicle travel information related to the traveling condition of the guided vehicle.

As indicated above, in the case in which, for example, a left turn is necessary at an approaching intersection that is a course change point, as described above, it is identified whether or not the guided vehicle can travel along the recommended route depending on the lane information, traffic category restriction information and traffic regulation information, at the road position at which the guided vehicle is traveling, peripheral carrier information, which is information related to carriers that are traveling in the vicinity of the guided vehicle, or guided vehicle travel information related to the traveling condition of the guided vehicle. Thereby, problem condition identified positions can be changed depending on these types of conditions.

The distance from the problem condition identified position to the course change point on the recommended route can be extended, for example, in the case in which there are many lanes between the current lane and a left turn lane, the case in which a left turn is not possible due to traffic category restrictions or traffic regulations, the case in which a left turn is not possible due to traffic congestion, or the case in which the traffic speed is high and a predetermined travel distance or more is required to make a left turn or a lane selection. In this manner, the search for a new recommended route can be carried out early, and even when the guided vehicle ends up deviating from a route, navigation can be carried in which the blank interval is reduced.

Preferably, the navigation apparatus that has been explained above is provided with a route deviation identifying portion that identifies whether or not the position of the guided vehicle has deviated from the recommended route, and a route deviation plan portion is provided that activates the recommended route searching portion and searches for a new recommended routes to the destination point in the case in which the route deviation identifying portion has identified that there is a high probability that the position of the guided vehicle has deviated from the recommended course.

The route deviation identifying portion and the route deviation plan portion are portion that find a new recommended route from the current position when the guided vehicle has actually deviated from the recommended route, and by providing these portion, it is possible to apply conventional route deviation plans.

In a recommended route search, the recommended route searching portion can execute a route search at a road unit, a cruising lane unit, or a travel point unit that is necessary to carry out travel that excludes travel following the road on the recommended route. Specifically, in the present application, the search for a recommended route may be carried out in any format. Here, in the case in which a recommended route can be provided at a traffic lane unit, it is possible to carry out guidance that is more accurate than conventional guidance.

BRIEF DESCRIPTION OF THE DRAWINGS

FIG. 4 is a drawing that shows the content of the link information for each link that is present in the map database.

FIG. 5 is a drawing that shows the content of the traffic information database.

BEST MODES FOR CARRYING OUT THE INVENTION

First Embodiment

Below, a first embodiment of the present invention will be explained with reference to the drawings.

Figure 1:
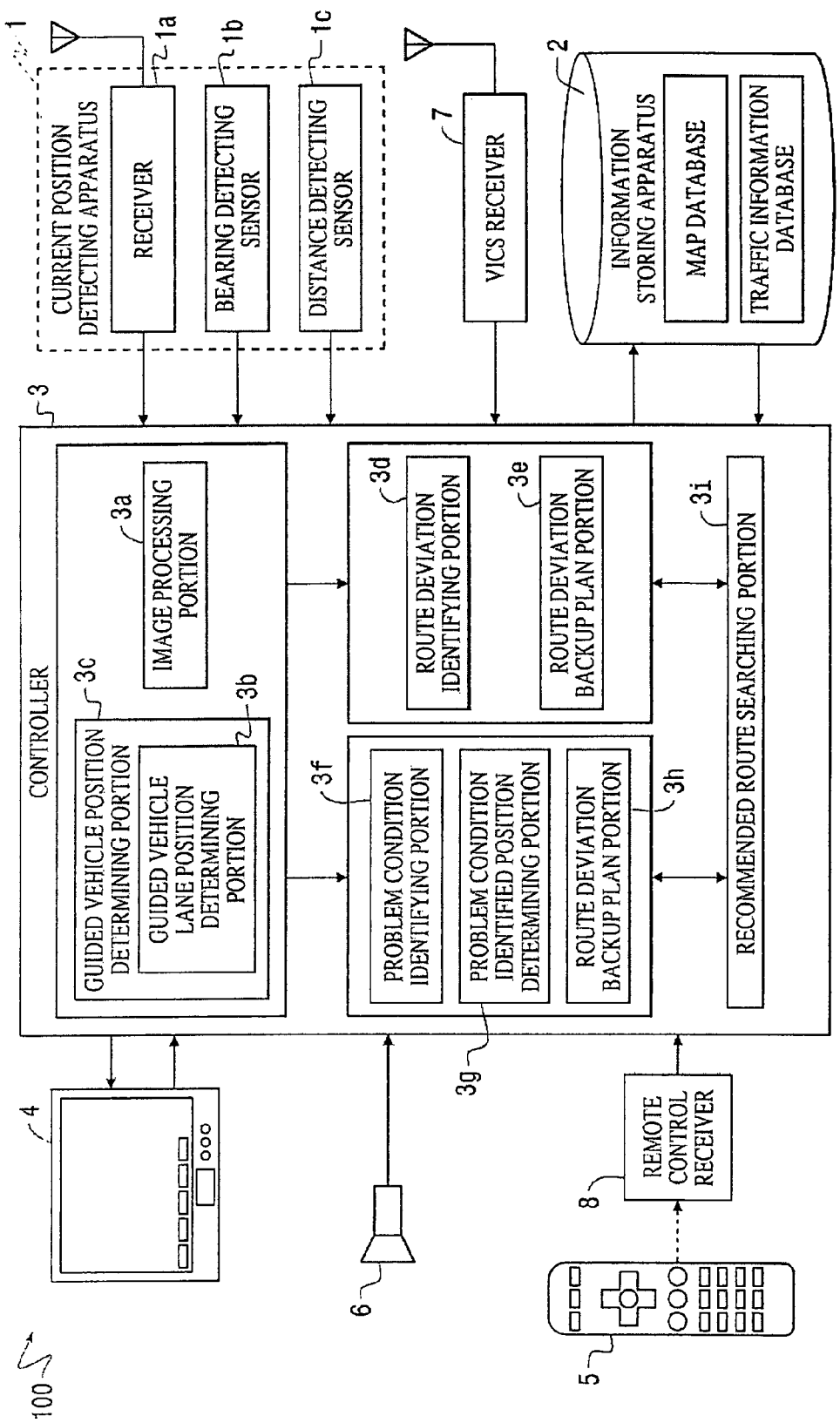
FIG. 1 is a block drawing that schematically shows the hardware configuration of a navigation apparatus according to the present embodiment.

FIG. 1 is a block drawing that schematically shows the hardware configuration of a navigation apparatus 100 according to the present embodiment.

As shown in FIG. 1, in its the general configuration, the navigation apparatus 100 according to the present embodiment is provided with a current position detecting apparatus 1, an information storage apparatus, 2, an controller 3, a display input apparatus 4, a remote control input apparatus 5, a mounted camera 6, and a VICS receiver 7.

Here, the current position detecting apparatus 1 is structured so as to provide a GPS receiver 1a, a bearing detecting sensor 1b, and a distance detecting sensor 1c.

The GPS receiver 1a is an apparatus that receives signals from satellites, and can obtain various types of information such as the time that the signal was sent (present time), the position information of the GPS receiver 1a, the movement speed of the GPS receiver 1a, and the forward travel direction of the GPS receiver 1a.

The bearing sensor 1b is structured, for example, by a geomagnetic sensor and a gyroscopic sensor, an optical rotation sensor or a rotation resistance volume sensor that is mounted on the rotating portion of a steering wheel, or an angle sensor that is installed on the wheels, and is able to detect the forward travel direction on the vehicle.

The distance detecting sensor 1c is structured, for example, by a sensor that detects the speed of a wheel or a combination of a sensor that detects the acceleration of the vehicle and a circuit that doubly integrates the detected acceleration, and it is able to detect thereby the movement distance of the vehicle.

The VICS (Vehicle Information and Communication System (registered trademark)) receiver 7 is an apparatus that receives a signal that has been transmitted from a signal generator disposed at a predetermined point on the road, and serves as an apparatus that can receive a VICS light beacon or radio wave beacon, or a VICS FM multiplexed broadcast signal. The controller 3 can obtain various types of traffic information such as the congestion information, current position information, and parking information from the signal that this VICS receiver 7 has received.

The information storing apparatus 2 is structured so as to have a recording medium that can store information, such as a hard disc drive, a DVD drive that is furnished with a DVD-ROM, or a CD drive, or the like, that is furnished with a CD-ROM, and a drive portion therefor. In addition, here, a map database 2a and a traffic information database 2b and the like are stored in the information storing apparatus 2.

The map database 2a is a database that stores map information that is to be displayed on the display unit 4a of the display input apparatus 4, and at the same time is a database that stores information for determining the lane position of the guided vehicle.

The map information is structured so as to have, for example, a road layer, background layer that has background information about facilities and the like, and a character layer for displaying characters such as the town or city names. Among these, the road layer is structured so as to have a plurality of nodes N that have position information on a map that is represented by longitude and latitude and a plurality of links L that form roads by linking two nodes N. As shown in FIG. 4, link information La for each of the links L is provided with a link number, the node numbers of the nodes N at both ends thereof, a road type (types such as highway, toll road, national road, prefecture road), and road attribute information such as the link length and width and the like.

Furthermore, this map database 2a stores, for example, the positions of a white line G2d, a broken line G3d, and a road edge G1d in the width direction of the road from the road center line G4d in each of the roads (refer to FIG. 3A) for use in the guided vehicle position determining portion 3b that is provided in the controller 3. This information is compared and checked with the image that has been picked-up by the mounted camera 6, and is used for determining the lane position of the guided vehicle.

In addition, this map database 2a stores lane information, traffic category restriction information, and traffic regulation information for each of the points with respect to each of the roads for use in the problem condition identifying portion 3f that is provided in the controller 3. This information is called in relation to the current position of the guided vehicle and the initial course change point on the recommended route and used for the problem condition identification.

In the present embodiment, as shown in FIG. 5, the traffic information database 2b is a database that stores information about the congestion degree and the travel time respectively corresponding to all links L (link number 1 to nnn) that are included in the map database 2a at a date (here, month and day, from January 1 to December 31) and the time (here, 15 minute units, from 00:00 to 23:45). Here, the congestion degree is represented by five steps, from 1 to 5, where 1 denotes is no congestion, 2 denotes low congestion, 3 denotes medium congestion, 4 denotes high congestion, and 5 denotes a traffic stoppage. Thus, the congestion degree increases as the numbers increase. Note that classifying the congestion degree in to the five steps from 1 to 5 is simply an example, and of course, a more or less detailed classification is possible.

The travel time is the time that is required to transit the distance from one node N to the other node N of each of the links L, and is represented in FIG. 5 by a numerical value having seconds as a unit. Note that the information that is stored in this traffic information database 2b can obtain by statistical processing, for example, the past travel time and the congestion degree at each of the links L at similar dates and times based on past VICS information, information of road traffic sensors, or information obtained, for example, from the traffic history information of the guided vehicle or other vehicles.

Returning to FIG. 1, the display input apparatus 4 is structured by a display unit 4a for displaying each type of information for route guidance such as maps and the recommended route R, information related to construction that is being carried out at the present time or in the vicinity of the recommended route R, and image information that has been photographed by the mounted camera 6, and an input unit 4b that receives input from the driver of the vehicle that is being guided. Here, it is possible to use, for example, a liquid crystal display apparatus, a plasma display apparatus, or a CRT (cathode-ray tube) display apparatus for the display unit 4a. In addition, here, the input unit 4b is provided with a touch panel that is furnished on the display screen of the display unit 4a and various types of switches that are disposed on the periphery of the display screen.

In addition, the remote control input apparatus 5 is an apparatus that accepts input from the driver of the vehicle and transmits this input to the controller 3 side by using a remote control, and the transmitted input information is input into the controller 3 via the remote control receiver 8.

The mounted camera 6 is structured so as to be able to photograph the scene in front of the vehicle, and the photographed image from this mounted camera 6 is sent to the image processing unit 3a, which is described below, and this becomes the object of image processing. In the present application, as will be described below, the information that has been obtained from this image processing is used for carrying out the determination of the lane position of the guided vehicle by the guided vehicle lane position determining portion 3b.

The controller 3 can be structured so as to provide, for example, a CPU that carries out various types of arithmetic processing and the operation control of each of the points of the navigation apparatus, RAM that is used as working memory when the CPU is carrying out the arithmetic processing, and a ROM that stores the software for various types of operating programs and control programs and the like for operating the CPU. In addition, the current position detecting apparatus 1, the information storing apparatus 2, the display input apparatus 4, the remote control input apparatus 5, the mounted camera 6, and the remote control receiver 8 can be connected to this arithmetic processing apparatus 3.

The arithmetic processing apparatus 3 is structured such that the software for attaining a predetermined objective is stored, and the software works in conjunction with the hardware to attain a certain objective. Specifically, software and hardware cooperate to structure a processing portion that realizes a predetermined objective. Here, as shown in the FIG. 1, the arithmetic processing apparatus 3 is provided with image processing portion 3a, guided vehicle position determining portion 3c that include a guided vehicle lane position determining portion 3b, route deviation identifying portion 3d, route deviation plan portion 3e, problem condition identifying portion 3f, problem condition identified position determining portion 3g, route deviation backup plan portion 3h, and recommended route searching portion 3i.

The arithmetic processing apparatus 3 is constructed such that mainly three types of objectives are attained based on predetermined operating programs, data, input information and the like.

The first objective is to determine the position of the guided vehicle, and a structure is used in which the position of the guided vehicle is determined up to the guided vehicle lane position according to information from the current position detecting apparatus 1 described above and information from the mounted camera 6. Based on this objective, the guided vehicle position determining portion 3c is provided that is includes the image processing portion 3a and the guided vehicle lane position determining portion 3b that are shown in FIG. 1

The second objective is to search for a new recommended route when the guided vehicle has deviated from the recommended route, and based on this object, the route deviation identifying portion 3d and the route deviation plan portion 3e are provided.

The third objective is to search in advance for a new recommended route before deviating from the route, and based on this object, the problem condition identifying portion 3f, the problem condition identified position determining portion 3g, and the route deviation backup plan portion 3h are provided.

Below, the each of the portion will be explained in sequence.

1. Determining the Position of the Guided Vehicle

In this determination, the information from the current position detecting portion 1, the information storing apparatus 2, and the mounted camera 6, which have been described above, is used.

The information from the current position detecting apparatus 1 described above can determine the approximate position of the guided vehicle within a range of 5 to 10 m. The approximate position information for the guided vehicle that has been found in this manner is used to determine the guided vehicle lane position in the guided vehicle lane position determining portion 3b.

Specifically, information that is used to determine the lane in which the approximate position of the guided vehicle is located is derived from information related to the road that is stored in the map database 2a. The number of lanes, white lines, the number of broken lines, the shape of the road shoulder and the like at the approximate position of the guided vehicle can be used for this type of information.

Figure 3A:
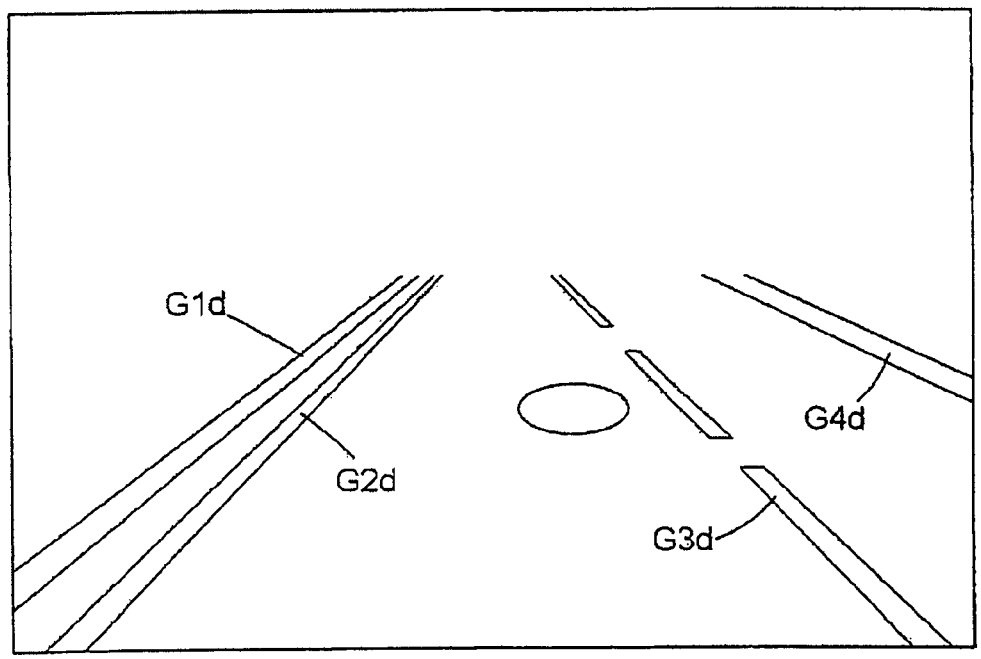
FIG. 3 shows drawings that indicate the state of FIG. 3A in which reference data is obtained from map data and a drawing that shows the photographic image FIG. 3B that is obtained when the determination of the travel lane is executed.

FIG. 3A shows the state in which the road edge G1d, the white line G2d, the broken line G3d and the center white line G4d at the approximate position of the guided vehicle have been photographed based on this type of information.

Figure 3B:
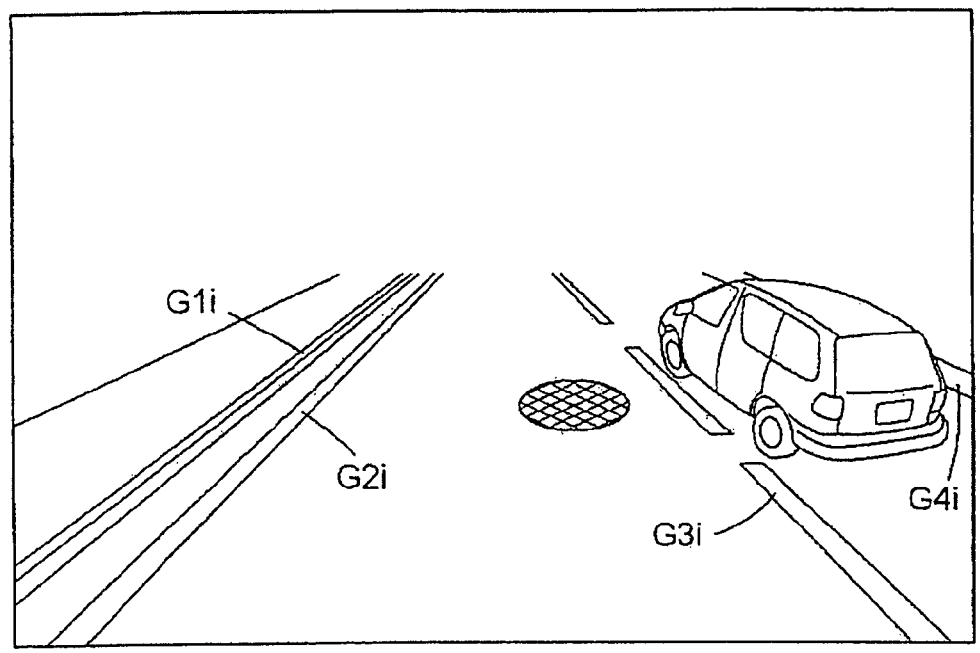

The photographed information from the mounted camera 6 is sent to the image processing portion 3a, and characteristic images (the road edge G1i, the white line G2i, the broken line G3i, and the center white line G4i) along the road at the approximate position of the guided vehicle are extracted from the photographic information. An example of this type is shown in FIG. 3B. This example is one in which the guided vehicle is traveling along the left side cruising lane among the two lanes on one side of the road.

In addition, in the guided vehicle lane position determining portion 3b, the information from the map database 2a (the information corresponding to FIG. 3A) and the information that has been obtained from the image processing portion 3a (the information corresponding to FIG. 3B) are compared and checked with respect to the positional relationship in the road-width direction, and the lane in which the guided vehicle is traveling is determined. In this comparison and checking, the images, which has been derived from the map information database 2a side, that the mounted camera 6, which is mounted on the guided vehicle, is expected to take showing that the guided vehicle is traveling in the left cruising lane, are compared to the actual photographed images that the mounted camera 6, which is mounted on the guided vehicle, has taken showing that the guided vehicle is traveling in the left cruising lane, and the lane that matches to the highest degree is set to the traffic lane along which the guided vehicle is currently traveling. In this manner, it is possible to determine even the lane position of the guided vehicle.

2. The Recommended Route Search

This recommended route search is executed by the recommended route searching portion 3i.

Basically, the recommended route searching portion 3i carries out processing in which a recommended route R from a starting point S to a destination point D is searched for and determined when a destination point D has been indicated by a user. Here, the starting point S is determined based on the current position of the guided vehicle, which has been detected by the current position detecting apparatus 1, but it is also possible for the user to indicate the starting point S by inputting the starting point S using the input unit 4b of the display input apparatus 4 or the remote control input apparatus 5.

Furthermore, in the present application, the recommended route searching portion 3i can also be used when the route deviation plan portion 3e and the route deviation backup plan portion 3h are searching for a new route. Therefore, when the route deviation plan portion 3e is searching for a new recommended route, the starting point S is set to the current position of the guided vehicle that has been identified as deviating from the route. When the route deviation backup plan portion 3h is searching for a new recommended route, in the case in which the problem condition identifying portion 3f has identified that the guided vehicle has deviated from the recommended route, the guided vehicle has deviated from the recommended route that has been used up to this point in time, and the starting point S is set to a position that the guided vehicle is anticipated to reach under the problem condition. In the example shown in FIG. 2B and FIG. 11B, this position becomes the position slightly more towards the right side (the side of forward movement) than the position shown by the C in the figure, which is a course change point. In this case, the guided vehicle departs from the recommended route, and a new route search is carried out assuming that the guided vehicle will continue to travel from near a position that the guided vehicle is anticipated to reach under the problem condition in the direction of travel that is anticipated at this position.

The processing in which the recommended route searching portion 3i searches for and determines a recommended route R can be carried out by a variety of well-known methods. For example, the search and determination can be carried out by the following method.

Figure 6:
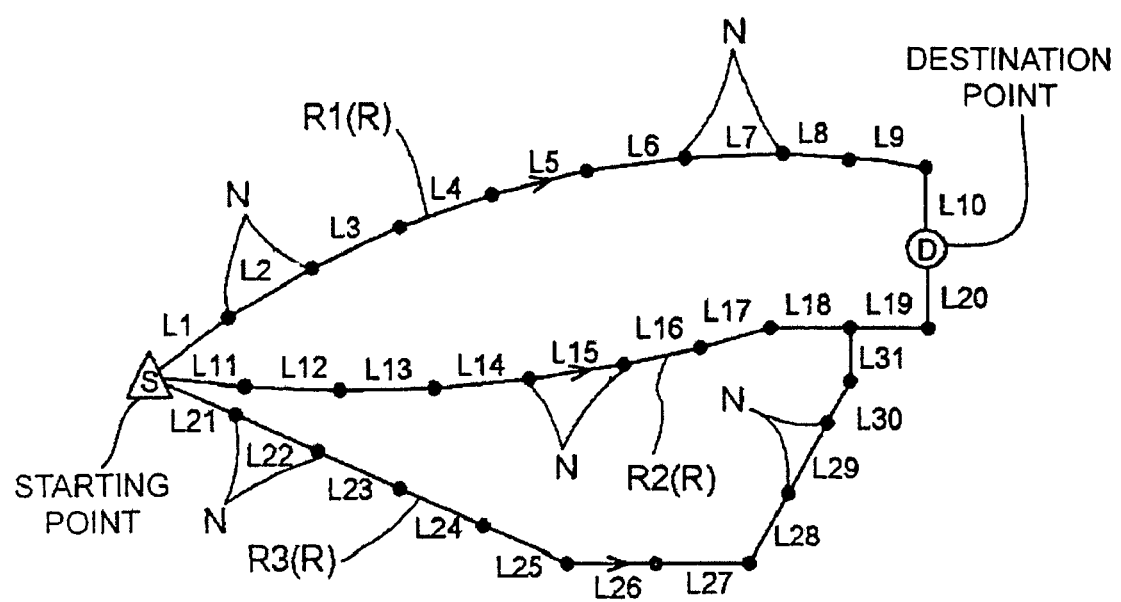
FIG. 6 is a drawing that shows the relationship between the links and the nodes that are used in a search for a recommended route.
Figure 7:
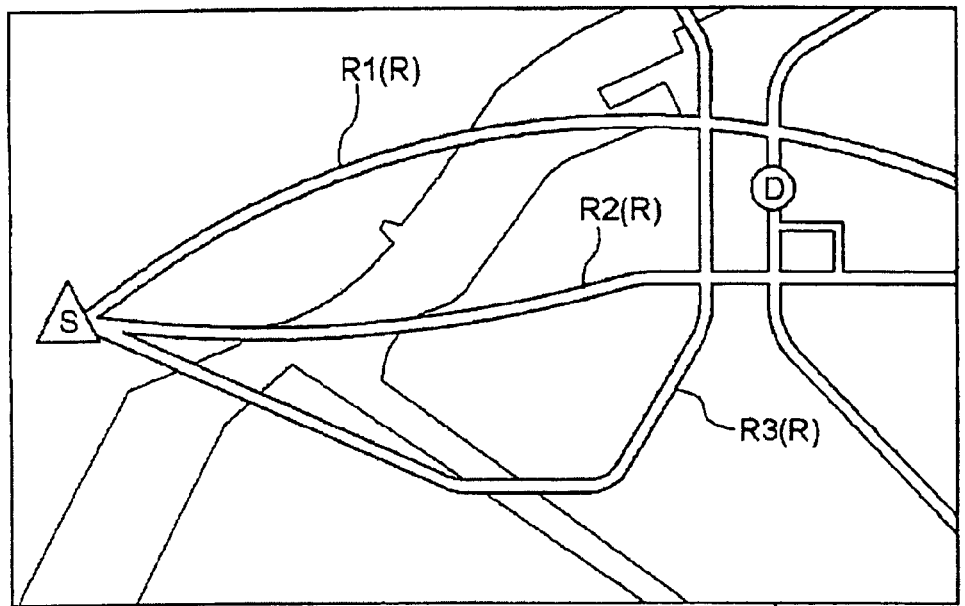
FIG. 7 is a drawing that shows an example of the display of the recommended route R.

This method is one that is based on the travel time for each of the links L that form the recommended route R. For example, as shown in FIG. 6, when the starting point S and the destination point D have been determined, a plurality of route candidates R1, R2, and R3 can be provided that connect both points. In addition, each of the route candidates R1, R2, and R3 are recognized to be a set of contiguous links L1, L2, . . . , that form these route candidates. For each of the links L, information about the travel time required to transit a link L for each date and time is stored in the traffic information database 2b.

Specifically, according to the traffic information database 2b shown in FIG. 5, which has been explained above, for any of the dates (for example, January 1) and time (for example, 00:00), the congestion degree (1 to 5) and the travel time (for example, 20 seconds, 135 seconds, 42 seconds and the like) are defined for all of the links L1, L2, . . . Lnnn, each of which is identified by a link number. Therefore, it is possible to calculate the anticipated required time that is necessary for transiting the entire route for all of the route candidates R1, R2, and R3, and, for example, where the required time is treated as the cost required to transit the route, the route candidate for which this cost will be the lowest is determined to be the recommended route R.

Note that in the above explanation, for the sake of simplification, an explanation was provided in which only the travel time serves as the element that determines the cost, but as is conventionally known, it is possible to include in the cost calculation, for example, the type (for example, highway, toll road, national road, prefecture road) and width of the roads that are included in the link information La for each of the links L, the time for transiting intersections in the case in which the node N that connects links L is an intersection, and furthermore, the distance from the starting point to a link L or a node N, a left or right turn, and the number of lanes in the road and the like.

3. Route Deviation Plans

Figure 12A:
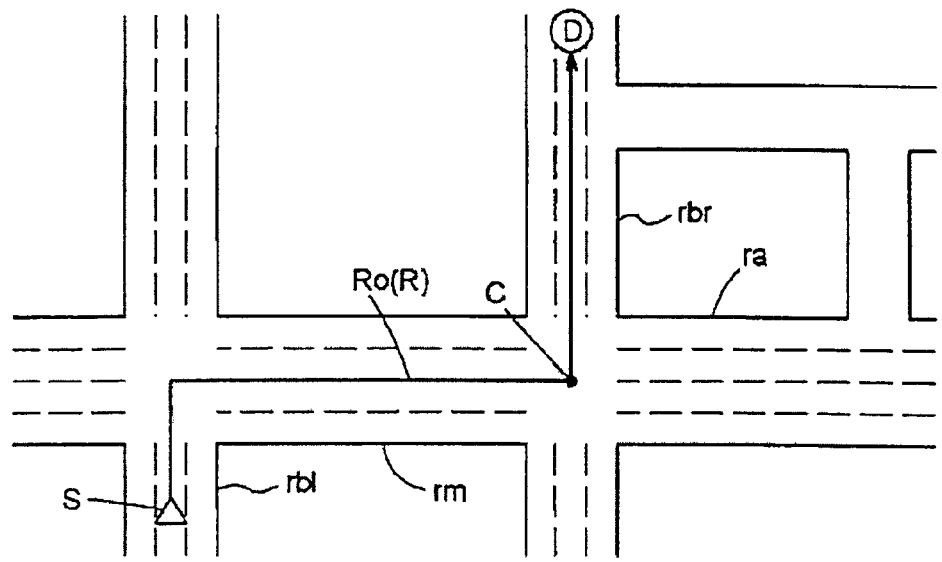
FIG. 12 shows drawings that indicate the problems in the case in which only a route deviation plan is executed.
Figure 12B:
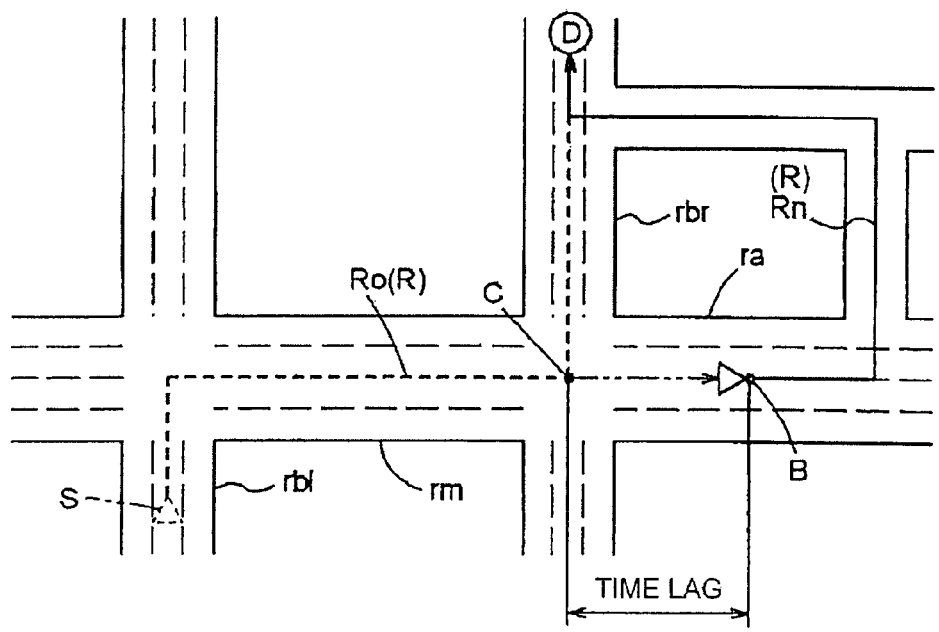

In order to respond to route deviations, both the route deviation identifying portion 3d and the route deviation plan portion 3e are provided. This plan portion 3e, such as the one that is provided in the conventional navigation apparatus 100, searches for new recommended routes from a position when the guided vehicle has actually deviated from the recommended route and entered the wrong road. The processing carried out by these portion is similar to the relationship between the recommended route Ro and the new recommended route Rn in FIG. 12A and FIG. 12B.

Therefore, the route deviation identifying portion 3d basically compares at a lane unit the approximate position of the guided vehicle that has been detected by the current position detecting apparatus 1 and the recommended route Ro, and determines whether or not the guided vehicle is on the recommended route Ro. Then, in the case in which the route deviation identifying portion 3d has identified that the position of the guided vehicle has deviated from the recommended route Ro, the route deviation plan portion 3e sets the current position of the guided vehicle to the starting point S and the destination point D that has been set up to this point in time remains the destination point D, and assuming that the guided vehicle will proceed forward in the current direction of travel, searches for a new recommended route Rn to this destination point by activating the recommended route searching portion 3i. Thus, in the case in which a route deviation actually occurs, navigation can be carried out using an accurate recommended route from this position.

Figure 10:
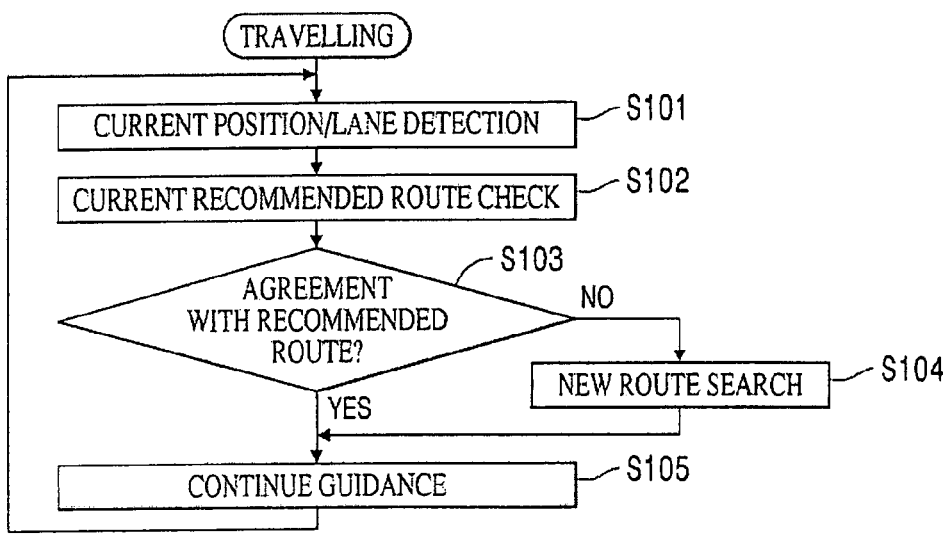
FIG. 10 is a drawing that shows the flow in which rerouting is carried out after deviating from a route.

The processing flow for this route deviation plan is shown in FIG. 10. As is shown in the figure, the detection of the current position and lane is executed (step 101), and the result is compared with the current recommended route Ro (step 102). In the case in which the result of this comparison matches (step 103: yes), the guidance continues as-is (step 105). In the case in which there is no agreement (step 103: no), after searching for a new recommended route Rn (step 104), the guidance continues according to this recommended route Rn (step 105).

4. Route Deviation Backup Plans

Depending on whether or not the probability that the guided vehicle will deviate from the route is high, the route deviation backup plans find a new recommended route Rn in advance for the case in which the guided vehicle may deviates from the route when the probability that the guided vehicle will deviate is high. Thus, based on this objective, the problem condition identifying portion 3f, the problem condition identified position determining portion 3g, and the route deviation backup plan portion 3h are provided.

Figure 2A:
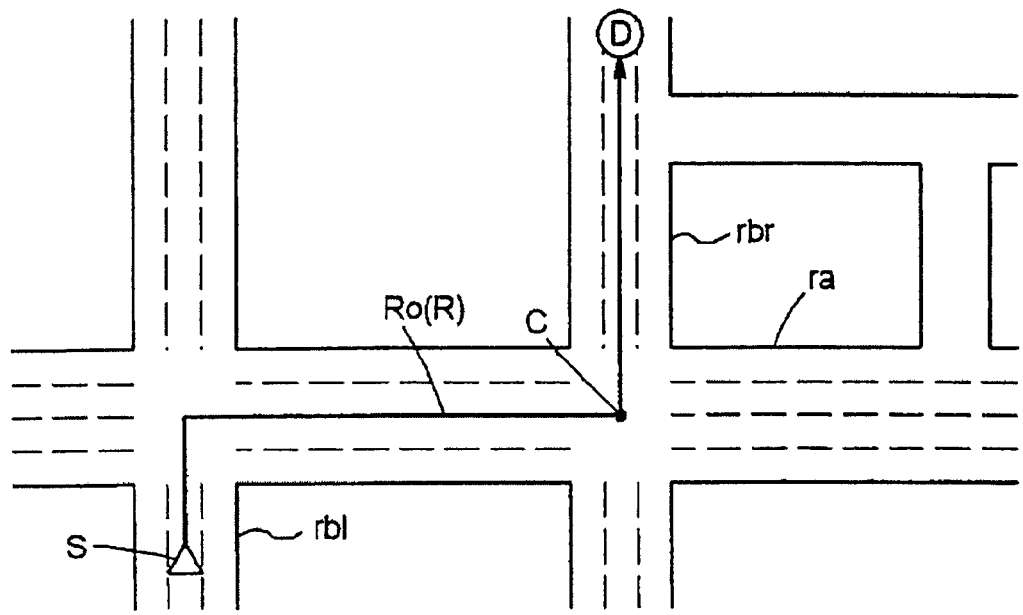
FIG. 2 shows drawings that indicate the search condition for a new recommended route in the first embodiment.

Here, the problem condition identifying portion 3f identifies the presence or absence of a problem condition that would make travel along the recommended route Ro difficult in terms of the current condition of the guided vehicle with respect to the recommended route Ro forward travel side of the position of the guided vehicle. In the case in which the problem condition identifying portion 3f has identified that a problem condition is present, the route deviation backup plan portion 3h sets the point that the guided vehicle is able to reach under the problem condition after deviating from the recommended route Ro, which has been used up to this point in time, to the starting point S (for example, the point that is slightly ahead of the course change point C in FIG. 2A), operates the recommended route searching portion 3i, and searches for a new recommended route from this starting point S to the destination point D that has been set in advance.

Therefore, in the case in which the problem condition identifying portion 3f has identified that travel along the current recommended route Ro is impossible due to some sort of condition, a search for a new recommended route from the point where the guided vehicle will deviate from this route to the destination point D is executed.

The problem condition identifying portion 3f carries out an identification of whether or not travel along the recommended route is possible based at least on the lane position of the vehicle that has been determined by the guided vehicle lane position determining portion 3b, which has been explained above.

For example, in the case in which it is identified that when a left turn is necessary at a course change point (an intersection or the like) during travel along the recommended route, there is no problem condition when the guided vehicle is in the left lane. However, that there is a possibility that a problem condition is present in the case in which the guided vehicle is in a no-turn lane or in the case in which the guided vehicle is in a right turn lane, and it is identified that the degree of the problem condition becomes higher as the guided vehicle becomes farther from the left-turn lane.

Furthermore, in this identification, at least one among the following is used as an element of this determination:

the traffic category restriction information and the traffic regulation information at the point on the road along which the guided vehicle is traveling;

the distance information to the initial course change point on the recommended route R, which is more toward the forward travel side than the position of the guided vehicle;

peripheral carrier information, which is information related to carriers that are traveling in the vicinity of the guided vehicle; and guided vehicle travel information, which is related to the travel condition of the guided vehicle.

The following is an example in which traffic category restrictions and a traffic regulation are used. The cruising lane change prohibitions at the point of travel and the like are consulted, and it is determined that the probability that there is a problem condition is high in the case in which the guided vehicle is in the no-turn lane, irrespective of presence of an approaching recent left turn intersection on the recommended route Ro in terms of the cruising lane on which the guided vehicle is currently traveling. In this case, the route deviation backup plan portion 3h searches for a new recommended route Rn using that fact that the guided vehicle is moving forward towards an approaching intersection as an element.

The following is an example in which distance information to the initial course change point on the recommended route Ro, which is more toward the forward travel side than the position of the guided vehicle, is used. It is identified that there is a problem condition in the case in which the guided vehicle is in the no-turn lane and furthermore that the distance to an intersection C for carrying out a lane change is insufficient, irrespective of whether, in terms of the cruising lane along with the guided vehicle is traveling, there is an approaching recent left turn intersection C on the recommended route Ro. In this case, the route deviation backup plan portion 3h searches for a new recommended route Rn by using the fact that the guided vehicle is moving forward towards an approaching intersection.

The following is an example of the peripheral carrier information, which is information related to the carriers that are traveling in the vicinity of the guided vehicle, is used. It is determined that there is a problem condition when there is an approaching recent left-turn intersection C on the recommended route Ro in the case in which there are currently many vehicles in the vicinity of the guided vehicle and the guided vehicle is traveling on the middle lane side. In this case as well, the route deviation backup plan portion 3h searches for a new recommended route Rn by using the fact that the guided vehicle is moving forward towards an approaching intersection C as an element.

The following is an example of travel information for the guided vehicle, in the case in which the guided vehicle is traveling at a comparatively high speed along a lane on the center side, is used. It is determined that there is a problem condition in which there is an approaching recent left turn intersection C on the recommended route Ro. In this case as well, the route deviation backup plan portion 3h searches for a new recommended route Rn by using as an element the fact that the guided vehicle is moving forward towards an approaching intersection as an element.

In the above explanations, explanations were provided that were related to examples in which a problem condition identification was carried out at an arbitrary travel point depending on the concept of what is referred in the present application as a problem condition identification. However, in the present embodiment, the zone in which this determination is carried out is determined.

Specifically, as shown in FIG. 1, a problem condition identified position determining portion 3g is provided that determines a problem condition identified zones or positions that will be subject to problem condition identification by the problem condition identifying portion 3f. In this example, this problem condition identified position determining portion 3g determines the problem condition identified zone based on the relationship between the problem condition zone and the initial course change point C on the recommended route Ro, which is more toward the forward travel side than the guided vehicle.

Figure 2B:
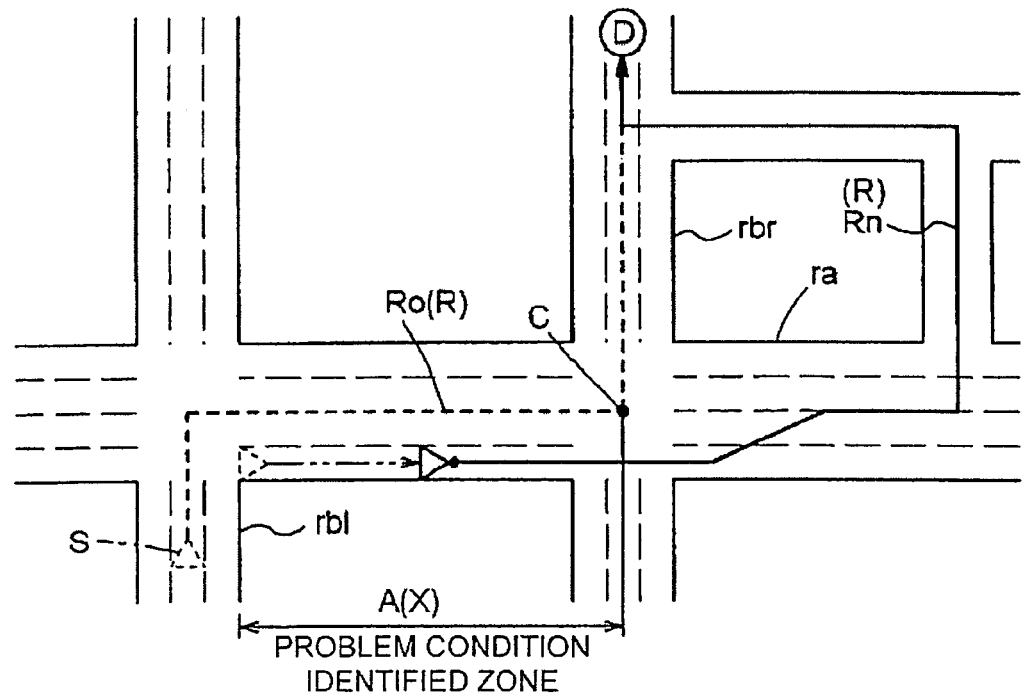

Therefore, normally the identification by the problem condition identifying portion 3f is not executed, and a structure may be used in which, for example, the problem condition identification is executed only within a zone that is at a predetermined distance X from a left-turn intersection C. This zone A is shown in FIG. 2B.

Figure 8:
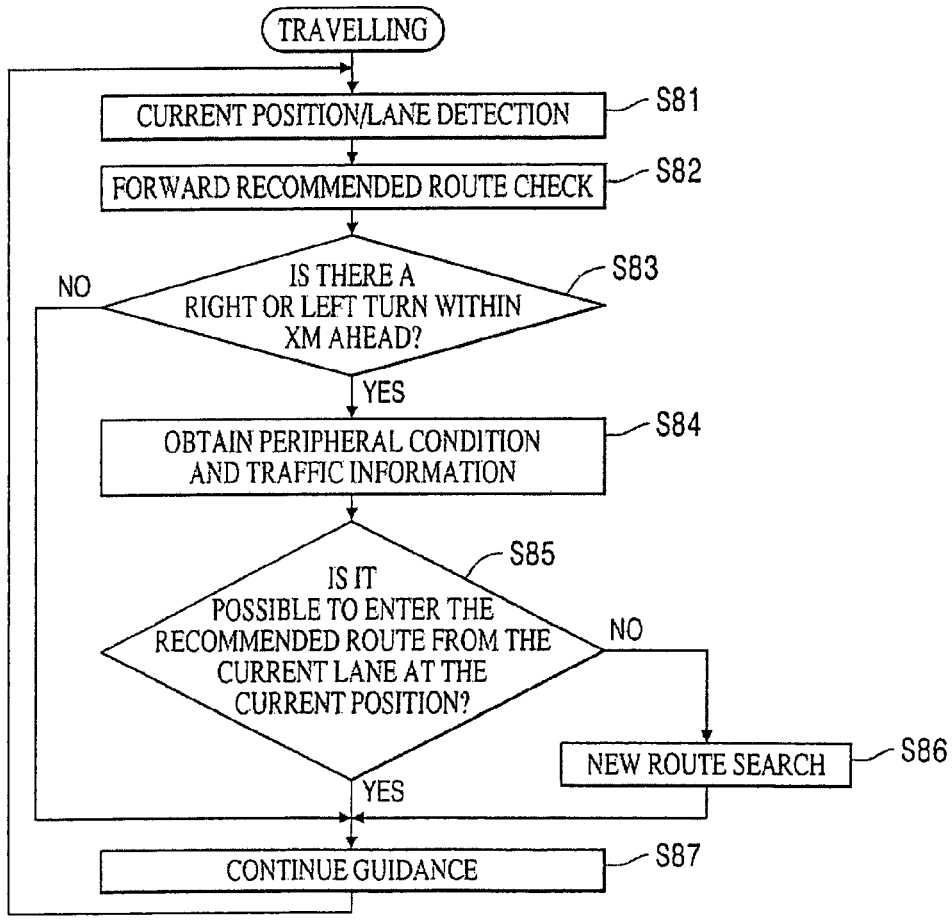
FIG. 8 is a drawing that shows the flow of a new recommended route search that accompanies the problem condition identification according to the first embodiment.

Below, the processing flow for the route deviation backup plan according to this example is shown in FIG. 8.

This processing flow is sequentially and repeatedly executed while the guided vehicle is traveling along the zone A, and when necessary, it carries out a search for a new recommended route Rn.

In this flow, first, the position of the guided vehicle and the guided vehicle lane on which the guided vehicle is traveling are detected on a map (step 81). Then, for the course change point C ahead of the guided vehicle, the travel route on which the guided vehicle should currently be traveling is checked with respect to the recommended route Ro that has been searched for in advance (step 82). At this checking stage, if the guided vehicle is traveling along the recommended route Ro, it is determined whether the guided vehicle attempting to travel on a route that conforms to this. Here, in the case of the example that is shown in FIG. 2, in the case in which the guided vehicle is traveling in the uppermost lane that allows a left turn, travel along the recommended route Ro is possible, but in the case in which the guided vehicle is traveling on the lowermost lane, the possibility of a route deviation becomes high.

In this condition, on the recommended route Ro, it is determined whether or not there is a course change point C within a predetermined distance Xm ahead (step 83). Specifically, it is determined whether or not it is necessary to carry out the problem condition identification with respect to the course change point C. In the example shown in FIG. 2B, the distance in the horizontal direction shown by zone A corresponds to X, and is preferably set to about 200 to 1000 m in the four-lane road shown in the figure. This determination uses as an identification element whether or not travel along the recommended route Ro is possible even if the guided vehicle maintains its current travel. Therefore, in this identification, in the case in which the position of the guided vehicle has become too close to the course change point C, this determination becomes "yes", and the processing in step 84 to step 86 is carried out in accordance with the determination that the probability that there is a problem condition is high.

In contrast, in the case in which the distance between the guided vehicle and the course change point C is equal to or greater than a prescribed value, it is identified that travel along the current recommended route Ro is possible, and the current guidance state is maintained (step 83: no).

In the case in which the determination in step 83 is "yes", the peripheral information for the guided vehicle and the vehicle information are obtained (step 84). Here, as has been explained above, the peripheral information for the guided vehicle denotes information about whether there are other vehicles present in the vicinity of the guided vehicle. Furthermore, vehicle information denotes, for example, the travel speed of the guided vehicle. This element originates in that, in the case in which the congestion degree is high and the travel speed is high, a left turn or the like becomes difficult.

Based on the information that has been obtained above, the identification of whether the guided vehicle can enter onto the recommended route is executed from the present position, which includes the current cruising lane (step 85). For example, in a condition in which other vehicles are crowded around the guided vehicle and the guided vehicle is traveling at a comparatively high speed, it is identified that there is a problem condition and it is identified that it is not possible to enter the recommended route. In contrast, in a condition in which there are no vehicles in the vicinity of the guided vehicle and the guided vehicle is traveling at a comparatively slow speed, it is identified in the problem condition identification that there is no problem condition, and it is identified that entering the recommended route is possible. In this case, when the traffic category restrictions and the traffic regulations at the present point in time or at an intersection are checked, and the presence or absence of a problem condition may also be determined.

In the case in which the identification described above is executed and it is determined that there is a problem condition and that the guided vehicle cannot enter recommended route Ro (step 85: no), the search for a new recommended route Rn is executed (step 86). This new recommended route search sets the position that the guided vehicle will reach under the condition that the problem condition continues as-is to the starting point S (the position slightly in front of the point C in FIG. 2), and travel is carried out according to this condition. In this case, the travel direction from this point is naturally in a direction of travel that depends on the problem condition.

In the case in which the identification described above is executed and it is determined that there is no problem condition and that the guided vehicle can enter the current recommended route Ro (step 85: yes), navigation according to the current recommended route Ro is executed (step 87).

In this manner, the search for a backup recommended route is carried out in the case in which the possibility that the guided vehicle will actually deviate from the route is high, and thus limited resources can be effectively used.

Second Embodiment

In the embodiment described above, the range in which the problem condition identification is carried out is determined with respect to an initial course change point C on the recommended route Ro, which is more toward the forward travel side than the guided vehicle, the distance X is constant, and the problem condition identification is carried out successively in a predetermined zone A, which is a more toward the course change point C than the position thereof. However, depending on the travel conditions, the distance from this course change point may be varied, and the identification may be carried out only at the position thereof.

Figure 11A:
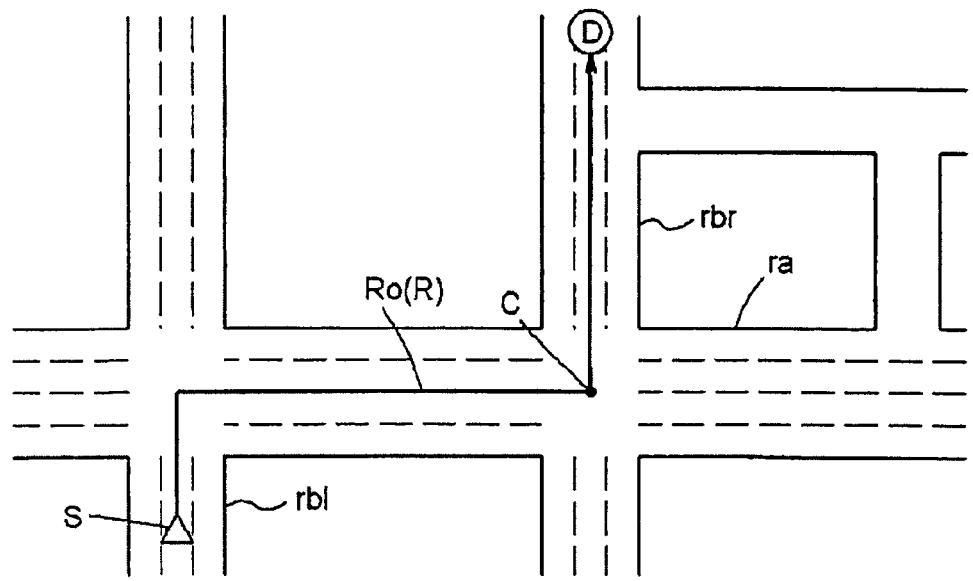
FIG. 11 shows drawings that indicate the search condition for the new recommended route in a second embodiment.
Figure 11B:
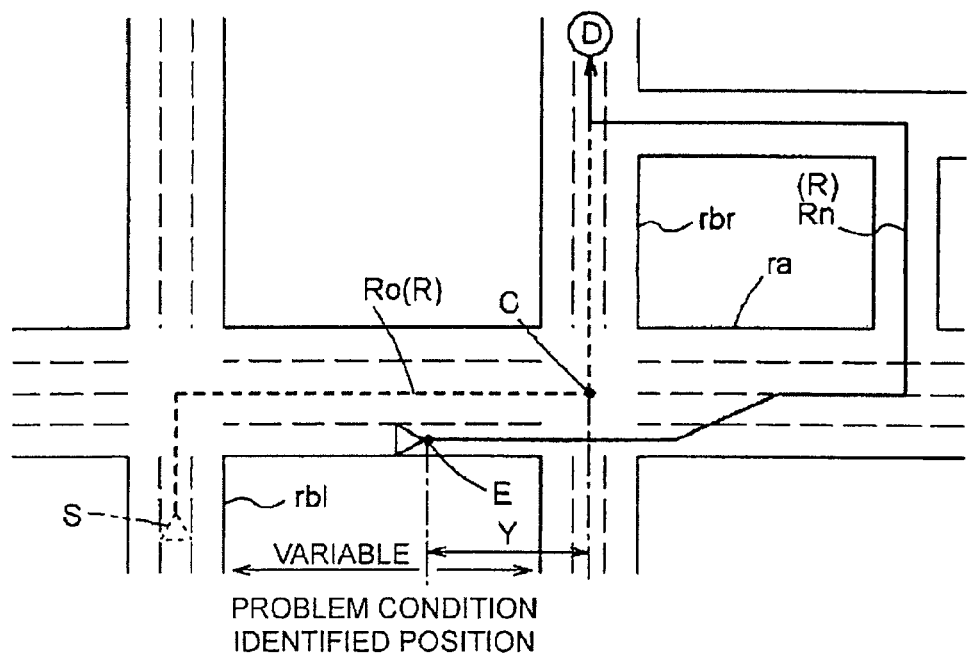

In this example, as shown in FIG. 11B, the distance Y itself, from the initial course change point C on the recommended route Ro to the problem condition identified position E, is determined based on at least one among the following at the point on the road at which the guided vehicle is traveling:

lane information;

traffic category restriction information and traffic regulation information;

peripheral carrier information, which is related to carriers that are traveling in the vicinity of the guided vehicle; and guided vehicle travel information, which is information related to the travel condition of the guided vehicle.

An example will be explained (refer to FIG. 11B) for the case in which the guided vehicle is approaching a left-turn intersection C on the recommended route Ro. As has been explained above, in the present application, it is possible to determine whether the cruising lane along which the guided vehicle is traveling is a left-turn lane or a no-turn lane. Thus, for example, the distance Y is lengthened in the case in which there are many lanes between the current lane and the left-turn lane, the travel speed is high, and the congestion degree is high. In the case in which the guided vehicle is not in the left-turn lane at this position, it is determined that a problem condition is present.

In contrast, in the case in which there are few lanes between the current lane and the left-turn lane, the travel speed is low, and the congestion degree is low, the distance Y is shortened, and in the case that the guided vehicle is not in the left-turn lane at this position, it is determined that a problem condition is present.

In this manner, the presence or absence of a problem condition can be determined with respect to the distance to the left-turn intersection C and the cruising lane.

In this case as well, when setting the distance Y, the distance Y may be set by referring to the traffic category restrictions and traffic regulations at a point on a road. In this case, for example, in the case of a zone in which a change in the cruising lane cannot be carried out, naturally the distance can be lengthened by an equivalent amount.

Figure 9:
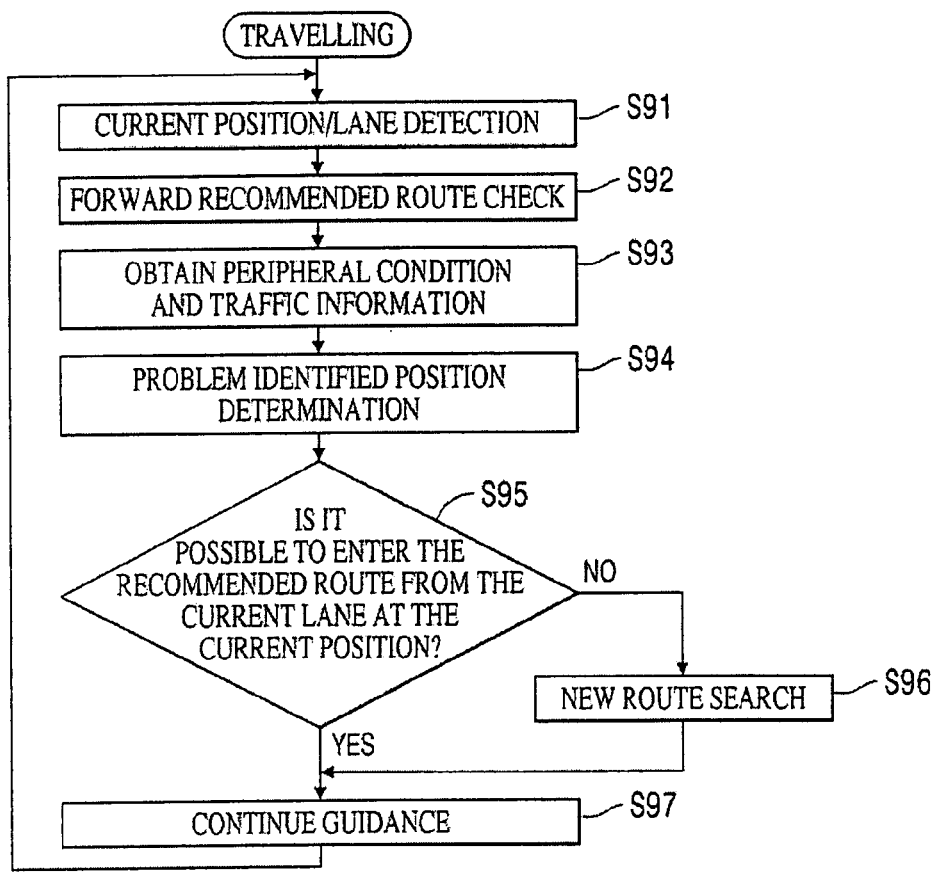
FIG. 9 is a drawing that shows the flow of a new recommended route search that accompanies the problem condition identification according to a second embodiment.

Furthermore, a specific explanation may be based on the processing flow that is shown in FIG. 9. The detection of the current position and lane of the guided vehicle (step 91), and the checking recommended route ahead (step 92) are similar to those above. At this stage, the current position and cruising lane along which the guided vehicle is traveling are determined, and the relationship between the cruising lane that is the target and the cruising lane along which the guided vehicle is currently traveling is identified.

Next, the peripheral carrier information and the guided vehicle travel information are read (step 93). The information that is employed in this manner is weighted, and the problem condition position E, which is at a distance Y from the intersection, is determined with respect to a predetermined reference distance. For example, in the case in which there are many carriers in the vicinity, a weighting is executed such that the distance Y is lengthened, and in the case that there are few carriers in the vicinity, a weighting is executed such that the distance Y is shortened (step 94). In addition, it is identified whether or not the guided vehicle can enter the recommended route Ro from the cruising lane at the problem identified position E that has been determined in this manner (step 95). Essentially, whether or not the guided vehicle is in a lane in which a left turn is possible at this position is the criterion for this identification.

As a result, in the case in which the lane can be entered (step 95: yes), guidance continues as-is (step 97), and in the case in which the lane cannot be entered (step 95: no), after searching for a new route Rn has been carried out (step 96), guidance continues according to this new route (step 97).

In this manner, even in the case in which the guided vehicle has deviated from the route, the blank interval in the navigation using the recommended route can be suppressed to a minimum.

Alternative Embodiments (1) In the embodiments described above, when determining the position of the guided vehicle, an example was presented in which determining the position of the guided vehicle including the cruising lane of the guided vehicle. However, in the present application, a determination of whether or not travel along this recommended route is possible while approaching the course change point is carried out as a problem condition identification. Depending on the results, a new recommended route search may be carried out, and not only carrying out the determination of the position of the guided vehicle at the cruising lane standard, but this determination may be carried out at the conventional road unit that does not include the cruising lane search.

In this case, this problem condition identification can be carried out depending on the travel speed and the distance from the position of the guided vehicle to the course change point.

(2) In the embodiments described above, an example was presented in which the search for a recommended route is carried out at the road unit, but the search for the recommended route may be carried out at a cruising lane unit that includes the cruising lanes. In this case, the route deviation identification works effectively, but the problem condition identification is carried out where the point at which the change of the cruising lane is necessary is set to the course change point that has been explained above.

Furthermore, a search may be carried out at the travel position unit (the course change point unit that has been explained above), in which it is necessary to carry out travel that excludes travel along the roads of the recommended route (that is, straight travel).

INDUSTRIAL APPLICABILITY

A navigation apparatus is obtained in which, even when a guided vehicle has deviated from a route, it is possible to minimize the time of the blank interval in the navigation, and a navigation method is obtained that realizes this type of navigation.

The invention claimed is:

1. A navigation apparatus comprising:
a guided vehicle position determining portion that determines the position of a guided vehicle; and
a controller that:
searches for a recommended route to a destination point;
determines a problem condition identified position that will be subject to problem condition identification based on a relation to an initial course change point on the recommended route ahead of the guided vehicle's position;
at the problem condition identified position, identifies the presence or absence of a problem condition that makes it likely that the guided vehicle will deviate from the recommended route, based on peripheral carrier information, which is information related to carriers that are traveling in the vicinity of the guided vehicle; and
if a problem condition is present, sets a starting point at a position where the guided vehicle is anticipated to reach after deviating from the recommended route, and
searches for a new recommended route from the starting point to the destination point,
wherein a distance from the initial course change point on the recommended route to the problem condition identified position is variable.

2. The navigation apparatus according to claim 1, wherein:
the guided vehicle position determining portion determines a position of a lane in which the guided vehicle is traveling; and
the controller identifies that a problem condition is present based on the determined lane position.

3. The navigation apparatus according to claim 2, wherein the controller identifies that a problem condition is present based on at least one of:
traffic category restriction information or traffic regulation information at the guided vehicle's position;

a distance to an initial course change point on the recommended route ahead of the guided vehicle's position; and a travel condition of the guided vehicle.

4. The navigation apparatus according to claim 1, wherein the controller identifies that a problem condition is present based on at least one of:

traffic category restriction information or traffic regulation information at the guided vehicle's position;

a distance to an initial course change point on the recommended route ahead of the guided vehicle's position; and a travel condition of the guided vehicle.

5. The navigation apparatus according to claim 1, wherein the distance from the initial course change point on the recommended route to the problem condition identified position is variably determined based on at least one of:

lane information;

traffic category restriction information or traffic regulation information at the guided vehicle's position;

the peripheral carrier information; and a traveling condition of the guided vehicle.

6. The navigation apparatus according to claim 1, wherein the controller:

identifies whether the position of the guided vehicle has deviated from the recommended route; and searches for a new recommended route to a destination point if the position of the guided vehicle has deviated from the recommended route.

7. The navigation apparatus according to claim 6, wherein the controller executes a route search at a road unit, a cruising lane unit, or a travel point unit that is necessary to carry out travel, excluding travel along a road that is present in the recommended route.

8. The navigation apparatus according to claim 1, wherein the controller executes a route search at a road unit, a cruising lane unit, or a travel point unit that is necessary to carry out travel, excluding travel along a road that is present in the recommended route.

9. A navigation method, for use with a navigation apparatus, comprising:

determining the position of a guided vehicle;

searching for a recommended route to a destination point;

determining a problem condition identified position that will be subject to problem condition identification based on a relation to an initial course change point on the recommended route ahead of the guided vehicle's position;

identifying, at the problem condition identified position, the presence or absence of a problem condition that makes it likely that the guided vehicle will deviate from the recommended route, based on peripheral carrier information, which is information related to carriers that are traveling in the vicinity of the guided vehicle; and if a problem condition is present:

setting a starting point at a position where the guided vehicle is anticipated to reach after deviating from the recommended route; and searching for a new recommended route from the starting point to the destination point, wherein a distance from the initial course change point on the recommended route to the problem condition identified position is variable.

10. The navigation method according to claim 9, further comprising:

determining a position of a lane in which the guided vehicle is traveling; and identifying that a problem condition is present based on the determined lane position.

11. A navigation method according to claim 10, further comprising:

executing a route search at a road unit, a cruising lane unit, or a travel point unit that is necessary to carry out travel that excludes travel along roads that are present on the recommended route.

12. A navigation method according to claim 9, further comprising:

executing a route search at a road unit, a cruising lane unit, or a travel point unit that is necessary to carry out travel that excludes travel along roads that are present on the recommended route.

13. A navigation method according to claim 9, further comprising:

identifying that a problem condition is present based on at least one of:

traffic category restriction information or traffic regulation information at the guided vehicle's position;

a distance to an initial course change point on the recommended route ahead of the guided vehicle's position; and a travel condition of the guided vehicle.

14. A navigation method according to claim 9, further comprising:

determining the variable distance from the initial course change point on the recommended route to the problem condition identified based on at least one of:

lane information;

traffic category restriction information or traffic regulation information at the guided vehicle's position;

the peripheral carrier information; and a traveling condition of the guided vehicle.

15. A navigation method according to claim 9, further comprising:

identifying whether the position of the guided vehicle has deviated from the recommended route; and searching for a new recommended route to a destination point if the position of the guided vehicle has deviated from the recommended route.

16. A navigation apparatus comprising:

means for determining the position of a guided vehicle;

means for searching for a recommended route to a destination point;

means for determining a problem condition identified position that will be subject to problem condition identification based on a relation to an initial course change point on the recommended route ahead of the guided vehicle's position;

means for identifying, at the problem condition identified position, the presence or absence of a problem condition that makes it likely that the guided vehicle will deviate from the recommended route, based on peripheral carrier information, which is information related to carriers that are traveling in the vicinity of the guided vehicle;

means for setting, if a problem condition is present, a starting point at a position where the guided vehicle is anticipated to reach after deviating from the recommended route; and means for searching for a new recommended route from the starting point to the destination point, wherein a distance from the initial course change point on the recommended route to the problem condition identified position is variable.

* * * * *